Jan. 11, 1927. 1,613,684
J. B. VAN DEREN
AUTOMATIC WEIGHING DEVICE
Filed Feb. 3, 1921 2 Sheets-Sheet 1
FIG. 1.
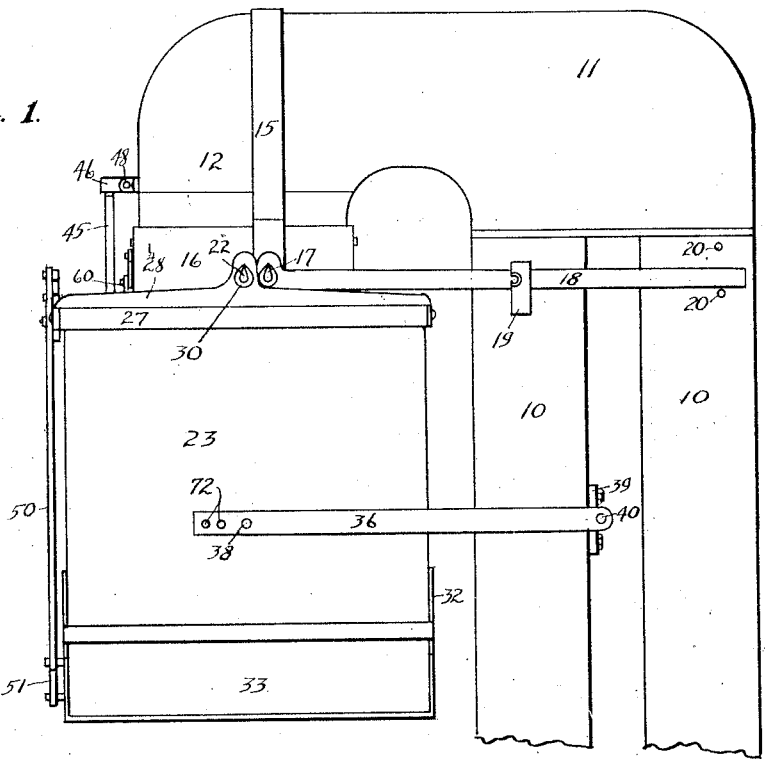
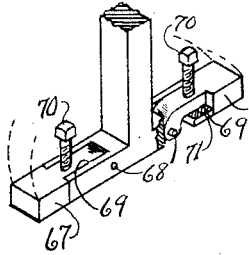
FIG. 8
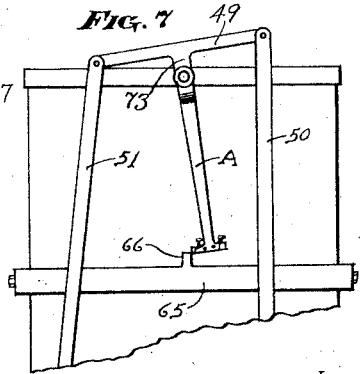
FIG. 7
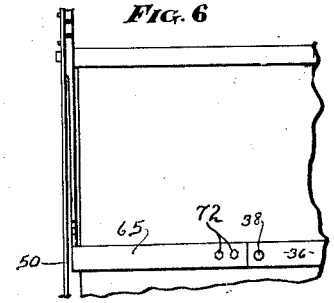
FIG. 6
INVENTOR.
James B. Van Deren
BY
G. G. Charles
ATTORNEY.

Jan. 11, 1927.  
J. B. VAN DEREN  
1,613,684  
AUTOMATIC WEIGHING DEVICE  
Filed Feb. 3, 1921    2 Sheets-Sheet 2

INVENTOR.  
James B. Van Deren  
BY  
U. G. Charles  
ATTORNEY.

Patented Jan. 11, 1927.

1,613,684

UNITED STATES PATENT OFFICE.

JAMES B. VAN DEREN, OF HENNESSEY, OKLAHOMA.

AUTOMATIC WEIGHING DEVICE.

Application filed February 3, 1921. Serial No. 442,102.

This invention relates to automatic weighers adapted primarily for weighing grain supplied in a continuous stream, and is designed more particularly as an improvement in the weigher on which I filed application for patent August 5, 1920, Serial No. 401,375, my object being to produce a machine which includes certain desirable features of construction imparting greater efficiency to the machine than that inherent in the above-identified copending application.

With this object in view the invention consists in certain novel and useful features of construction and combinations of parts as hereinafter described and claimed; and in order that it may be fully understood, reference is to be had to the accompanying drawings, in which:—

Figure 1 represents a side elevation of an automatic weighing machine embodying the invention and shown as applied to the upper end of an elevator of conventional type;

Figure 6 is a fragmental view illustrating a modified form of the lock mechanism;

Figure 7 is a side view of the construction disclosed by Figure 6; and

Figure 8 is an enlarged detail perspective view of the locking feature illustrated in connection with Figures 6 and 7.

Figure 3:
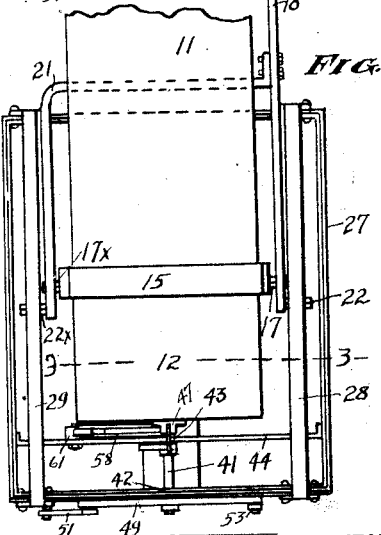
Figure 3 is a top plan view of the construction as shown by Figure 2.

Referring now to the drawings in detail, 10 indicates the legs, 11 the head and 12 the discharge end or hopper of the head of an elevator of any suitable or preferred type, and fitting on the tapered portion or hopper of the head is a tapered chute or deflector 13, the same being pivotally suspended from the head as at 14. Rigid with the head 11 is an inverted U-shaped hanger 15 terminating at opposite sides of the chute 13 and equipped at its lower end with outwardly projecting knife bearings 17, 17ˣ. A scale beam 18 is fulcrumed on the knife bearing 17 and is equipped with an adjustable poise or weight 19, the scale beam being adapted to be graduated in the customary manner, not shown, and to limit the vertical play of the scale beam, its free end projects between a pair of stop pins 20 projecting from one leg of the elevator. An L-shaped bar 21 is secured to the scale beam 18, and one of its arms parallels said scale beam and is disposed at the opposite side of the hanger 15 and is fulcrumed upon the companion knife bearing 17ˣ, as shown most clearly by reference to Figure 3. Adjacent but forward of the bearing 17, the scale beam is equipped with knife edge bearings 22, 22ˣ, for a purpose which will hereinafter appear.

The container 23 of the device is of box-like form and is preferably made of sheet metal and is provided with a central vertical partition 24 dividing it into two compartments 25 and 26. At its upper end it is equipped with a stiffening band 27, and bridging the container near its opposite side walls is a pair of bars 28 and 29 secured at their opposite ends to the stiffening band 27, and said bars midway their length are provided with bearing openings 30 engaged by knife edge bearings 22, 22ˣ, of the scale beam construction. It will thus be seen that the adjustment of the poise on the scale beam will determine the weight of grain entering the container which is necessary to effect descending movement of the same, the operation being the same as with any conventional scale equipped with a beam.

The bottoms of the compartments of the container are controlled by wing doors 32 and 33 pivoted respectively at 34 and 35, to the lower ends of the container, the doors being adapted for operation in reverse directions simultaneously, as will hereinafter appear.

As a means of preventing undue sway of the container, it is preferably pivoted at 38 to and between a pair of arms 36 and 37, said arms being pivoted at their opposite ends as at 40 to a bracket 39 secured to one of the legs of the elevator. In the construction shown by Figures 6 to 8, inclusive, arms 36 are utilized for carrying an element of certain latch mechanism hereinafter described.

Figure 2:
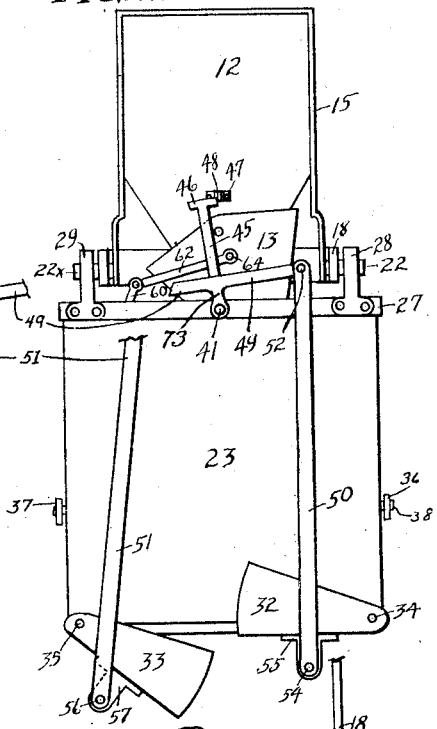
Figure 2 is a front elevation of the same with a part broken away and illustrated at one side of the figure to avoid hiding certain other features of construction.
Figure 5:
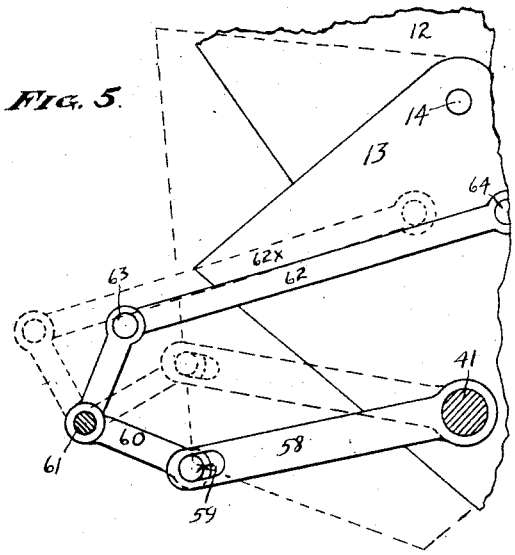
Figure 5 is an enlarged detail illustrative of lever movement controlling the pivoted chute or deflector for discharging the grain into one compartment or the other of the container of the device.

A short shaft 41 is journaled in the band 27 as at 42 in Figure 2, and in a second bearing 43 carried by a cross bar 44 secured at its opposite end to opposite sides of the container, and said shaft is provided with an upwardly-projecting arm 45 terminating in a head 46 for engagement at either side with a pivoted stop 48 mounted in a bracket 47 secured to the discharge end of the elevator head 11. The shaft 41 is also equipped with a T-shaped rocker bar 49, the lower end of the depending stem 73 of the rocker bar being secured upon the shaft as shown most clearly by Figure 2. A pair of links 50 and 51 are pivotally connected at their upper ends at 52 and 53 to the opposite extremities of the T-shaped rocker bar in a plane above that of the shaft 41, and the lower ends of said links are respectively pivoted at 54 and 56 to brackets 55 and 57 depending from the doors 32 and 33 respectively, it being noted that the pivotal points of connection of the links 50 and 51 with the doors are below the axes of the latter. It will be apparent from the foregoing that downward movement of one of the doors transmits upward movement to the other through the rocker bar, and that the latter in turn, imparts corresponding movement to shaft 41 and hence to the arms 45. To utilize the same power for oscillating the chute or deflector 13, shaft 41 is provided with a rock arm 58 having a longitudinal slot 59 at its free end engaging pivotally with one end of a bell crank lever 60 mounted on the cross bar 44, the opposite end of said bell crank being pivotally connected at 63 to one end of a link 62 pivoted as at 64 to the chute or deflector. In Figure 5 the chute is illustrated in full and dotted lines in two opposite positions.

Figure 4:
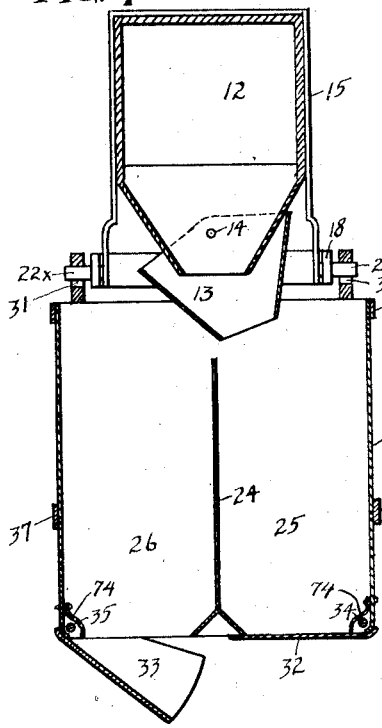
Figure 4 is a vertical section taken through the container in the plane of the point from which the same is suspended from the scale beam of the structure.

Assuming that the container is empty with the parts in the position shown by Figure 4, that is, with the container in balanced relation with respect to the power of the scale beam, it will be apparent that the grain flowing from the elevator hopper through the chute will enter the compartment closed by the respective door, and that, as the weight of the grain increases, the container will gradually descend. As it attains the point in its descent predetermined by the position of the poise on the scale beam, the head of arm 45 will be brought to a position slightly below the plane of the pivoted stop 48, and at the same moment the weight of grain on the door 32 will cause the same to swing downward to discharge the grain, this action of the door as hereinbefore explained, effecting the closure of the other door and the operation of the shaft 41. The operation of the shaft swings the arm 45 to the opposite side of the pivoted stop 48, and because of the connection shown by Figure 5 most clearly, instantly reverses the position of the chute 13 so that the stream of grain from the head 11 shall be diverted into compartment 26. As the chute 13 is reversed in position as explained, the weighted scale beam reelevates the container and the head 46 of arm 45 is brought to bear against the right hand side of the pivoted catch 48, which catch is pivoted so that during the swinging movement of the arm 45 it shall be capable of swinging upward so as to offer the least possible resistance to the operation of said arm. The said arm and the pivoted catch constitute the latch or lock mechanism for retaining a door positively closed until the container has descended a sufficient distance under a predetermined weight of grain to lower the arm 45 sufficiently to clear the pivoted catch as will be readily understood.

In the construction shown by Figures 6 to 8 inclusive, the T-shaped rocker bar has its stem extended downward as at A, the extension having the same function as the upwardly projecting arm 45, as will hereinafter appear. In the construction employing the depending arm A, the bars 36 and 37 are utilized to carry a stop mechanism, comprising a horizontally arranged U-shaped bar 65 to be secured at points 72 to said bars, and provided with an upwardly projecting stop 66 for engagement at opposite sides by a pair of pivoted dogs 67 forming heads for the arm A, the said dogs being pivoted as at 68 to the said arm. It will be noted by reference to Figure 8 that the parts of arm A to which the dogs 67 are pivoted, are channelled as at 69 to prevent the dogs 67 dropping below a horizontal position, and that adjusting screws 70 are mounted in said devices and engaged by the channels to effect vertical adjustment of dogs 67.

When the container is in balanced relation with respect to the scale beam, with one of the doors fully closed and the other fully opened, one of the dogs 67 bears at its end on one side of the stop 66. The descent of the container as the load thereon increases, effects a proportionately greater descent of the lug 66 so that by the time the container has received the requisite volume of grain, the lug 66 clears the lower edge of the engaging dog 67 to permit the closed door to open and discharge the grain from the container and to effect a reversal in the position of the chute, as hereinbefore explained in connection with the construction shown by Figures 1 to 5, inclusive. As this change in the position of the parts is effected, the container is reelevated and the other dog 67 of arm A engages the opposite side of the stop 66. The latch mechanism of the construction shown by Figures 6 to 8 inclusive, is essentially the same in principal and in construction as that shown in the preceding figures, but possesses the advantage of enabling the operator to adjust either of the dogs 67 so that it shall more quickly become disengaged from the stop 66 in the event the operator finds that the respective compartment is uniformly delivering a heavier charge of grain than the other compartment. In other words, by making provision for adjustment of the dogs 67, any irregularity in the amounts of grain delivered by the two compartments can be rectified.

It sometimes occurs that the grain being weighed contains more or less moisture and has a tendency to adhere to the doors. Such grain, it is desirable to exclude as far as practicable from the hinge points of the doors, and to accomplish this, guard plates 74 are secured to the wall above the hinge points and extend convergingly downward, these plates being sufficiently thin to cut through any adhering mass of grain on the upper faces of the doors as the latter close, it being also noted that the lower edges of said plates bear such relation to the doors that when the latter are fully open a considerable space intervenes between them and the doors, and thus provides for the ready escape of any grain which may have reached a position below the guards and adjacent the hinge points of the doors.

By reference to Figure 2 it will be noted that the relation between the lower ends of the links 51 and the hinge of doors 33, and between the upper end 53 of said link and the pivotal point 41 of the rocker bar, is such as to give the open door an advantage in leverage over the closed door. As the container is lowered sufficiently to trip the latch mechanism, that is disengage the arm from the stops 48 or 66 as the case might be, the weight of grain on the closed door overcomes the leverage advantage possessed at the time by the open door, this disadvantage of leverage diminishing until both doors are open to the same extent, from which time the opening door increases and the closing door decreases its leverage. This is desirable because at this time the weight of grain on the door has been materially reduced, and it is essential that the opening door shall have the advantage of leverage in the latter part or half of its movement in order to insure the proper closure of the other door and proper adjustment of the chute to discharge the grain into the compartment of the closing door. In practice, the machine is so timed, that by the time the grain thus deflected reaches the bottom of the compartment, the door is closed and thus guards against delivery of unweighed grain.

Among the advantages of having the doors 33 and 34 above the lower edge of the container against which they close, and pivoting the links 50 and 51 below the horizontal plane of such hinges, and in placing the pivotal connection of said links above the axis of the rocker arm 73 when in central position, are the following:—To amplify the gravitative force of the discharging commodity for closing the open door and in actuating other necessary movable parts of a machine of this character; to reduce the pressure on the latch mechanism and consequently reduce friction at that point and minimize wear of the parts and retardation of the scale beam; to provide a locking function for holding the closed door closed without the aid of the latch mechanism until a predetermined amount of grain or the like has been deposited in the container upon such closed door and thus give ample time for the scale poise to return the container to its elevated position even if the material is slow in discharging; to give a quick movement to the deflector and thereby insure substantially accurate weighing even where the continuous flow of grain is very uneven.

It will be apparent, of course, that due to the arrangement of and connection between the operative parts, the opening door at first moves slowly and the closing door rapidly, the former opening but slightly by the time the latter has reached a position where the leverage is neutral, and that by the time the doors have attained such positions the chute has been sufficiently reversed to deflect the major part of the grain into the other compartment, and it will also be apparent that during the remainder of the door movements, the opening door moves rapidly and the closing door relatively slowly, the advantage of leverage during this part of the door movements being in favor of the opening door and increasing until fully open so that momentum of the opening door is not depended upon to ensure the complete opening thereof and closing of the other door. As shown the drawings do not bring out this difference of leverage as clearly as desirable, but it will be at once evident if it will be assumed that a change in the relative proportions of the stem and arms of the T bar can be made which will lie between a balanced relation of the doors and such relation as to give the open door an almost complete resistance to opening movement by the closed door, this result being most effectively and efficiently obtained where the positioning of the doors with relation to the T bar and container is such as to establish a cooperative relation between them.

I claim:

1. In an automatic weighing device, a yieldingly-elevated container having two compartments, a door for each compartment, the said doors being simultaneously operable in reverse directions, a rocker bar pivotally mounted at an intermediate point between and below its extremities, said pivotal point on surfaces bearing a substantially fixed relation to the mounting of the hinges of said doors, and links pivotally connected to the arms of the rocker bar at points above the plane of the pivotal point thereof, and pivoted to said doors respectively; the relation of the doors, rocker bar and links being such under the application of sufficient power to drive the opening door past a balanced relation with the closing door, as to give the opening door when the balanced relation point is passed, an advantage of leverage to insure its full opening operation and the full closing operation of the closing door.

2. In an automatic weighing device, a yieldingly-elevated container having two compartments, a door for each compartment, the said doors being simultaneously operable in reverse directions, links pivoted to said doors below a line through the hinge points of said doors parallel with the commodity supporting surfaces of the doors, and a T-shaped rocker bar fulcrumed on the container at the point bearing a substantially fixed relation to the mounting of the door hinges and pivoted to said links above the horizontal plane of the said fulcrumed point of the rocker bar at similar distances from said fulcrum point.

3. In an automatic weigher, a yieldingly-elevated hopper having two compartments, a door for each compartment simultaneously operable in reverse directions, a T-shaped rocker element pivotally mounted at its lower end on the container, links pivotally connected to the respective arms of the rocker element and means cooperative with the T-shaped rocker and links for assisting the open door in holding the closed door closed until a predetermined weight of commodity has accumulated in the container irrelative to the leverage relations of said doors.

4. In an automatic weighing device, a double compartment container, pivoted doors controlling the discharge openings of said compartment respectively, a rocker element pivotally mounted at a point bearing a substantially fixed relation to the mounting of the pivots of the door hinges, links pivoted to said doors and pivotally connected to respective sides of said rocker element at points above the plane of the pivotal mounting thereof, and a chute pivoted and operable to deliver alternately into said compartments and being operated by the power of the doors, irrelative to the downward movement of the container.

5. In an automatic weigher, a yieldingly-elevated container having two compartments, wing doors controlling the bottoms of said compartments, links pivoted to said doors below the horizontal plane of the hinges thereof, a T-shaped rocker bar fulcrumed on the container and pivoted to said links above the horizontal plane of the fulcrum point of the rocker bar, a pivoted chute, means for transmitting power exerted by the opening door to reverse the position of the chute to cause the same to deliver into the compartment of the closing door, and latch mechanism for securing either door in open position and the other door closed, and adapted to be tripped by downward movement imparted to the container by a predetermined weight therein.

6. In an automatic weighing device, a container having two compartments open at the bottom, pivoted doors controlling said openings and pivoted near the outer side walls of said compartments, and downwardly converging guards secured to such walls and terminating at their lower edges near the plane occupied by the inner surfaces of the doors when closed, the lower edges of said guards being disposed inward of the plane of the pivotal points of the doors and spaced from the latter when open.

7. In an automatic weighing device, a yieldingly elevated hopper having two compartments, a door for each compartment simultaneously operable in reverse directions, a rocker element pivotally mounted on the container at a point bearing a substantially fixed relation to the mounting of the door pivots, links pivotally connected to the respective sides of said element at points above the plane of the pivotal mounting thereof, and pivoted to said doors respectively, a vertically-movable stop, and a locking element bearing a substantially fixed relation to said rocker element and movable vertically therewith and normally engaging one side of the stop, and disengaged therefrom by downward movement of the container.

8. In an automatic weighing device, a yieldingly-elevated container having two compartments, a pair of doors controlling the discharge openings of said compartments, and simultaneously operable in reversed directions, a latch mechanism, comprising a stop movable relatively with respect to the container, an arm on the container operable by either door when opening and a pair of dogs carried by the arm for engaging opposite sides of the stop, the dogs being independently adjustable as toward and from the plane of the stop.

9. In a weighing machine, a vertically movable double compartment container, doors controlling the compartments, and a latch mechanism to hold one door closed and comprising normally overlapping elements separable by downward movement of the container and when separated relatively operable laterally in opposite directions by an opening door, one of said elements having a pair of adjustable dogs for alternate engagement with opposite sides of the other element when in overlapping relation.

10. In an automatic weighing device, a pair of hinged doors adapted for use in controlling the discharge openings of a two compartment container, a pair of links having their respective lower ends connected to said doors respectively, and means connecting the upper ends of said links whereby as either door shall open the other shall close, the opening door increasing in leverage on said means while the closing door cooperatively decreases in resistance, to increase the operative power efficiency of the doors, inherent therein and as acquired from the gravitative force of the weighed commodity; and employing the power of the doors, irrelative to the downward movement of the container, in the operation of said weighing device.

11. In an automatic weighing device, a yieldingly-elevated container having two compartments, wing doors, hinged above the plane of the commodity supporting surfaces thereof, controlling the discharge openings of said compartments, flanges converging inwardly from the plane of the respective outer side walls of said compartments to cover the increased opening due to said position of the hinges of the doors, to prevent discharge of commodity from the side of said doors and to present a thin surface to the doors as they close, a rocker element pivotally mounted on the container at a point bearing a substantially fixed relation to the mounting of the door hinge, and a pair of links having their lower ends pivotally connected to the respective doors and their upper ends pivotally connected to said rocker element at respective sides of the vertical plane of the pivotal mounting of said element when in upright position, and above the horizontal plane of said pivot; the position of the connections of the links to the rocker element being such as to increase the operative power efficiency of the doors.

12. In an automatic weighing device, a two compartment container, pivoted doors controlling the discharge openings of said compartments respectively, a rocker element mounted at a point bearing a substantially fixed relation to the mounting of the pivots of said doors, links pivotally connected to said doors respectively and pivotally connected to respective sides of said rocker element at points above the pivotal mounting thereof, and means for locking the closed door in closed position; the relation of the doors, links and rocker element being such that on the application of sufficient power to break the locked relation and to drive the opening door substantially past balanced relation with the closing door to give the opening door an advantage in leverage on said rocker element as compared to the closing door to increase the power operative efficiency of the doors inherent therein and acquired from the gravitative force of the commodity in their opening movements.

13. In an automatic weighing device, a two compartment container, wing doors controlling the discharge openings of said compartments, a pivoted rocker element having connections with said doors whereby as either door is opened the other door is closed, embodying the positioning of the connections of the doors to the rocker element at points above the plane of the fulcrum thereof and at respective sides of the vertical plane of the fulcrum when the rocker element is in upright position; the relation of the doors and the connections to the rocker element being such that the opening door gains in leverage on said element in its opening movement while the closing door cooperatively decreases in leverage resistance as it closes, the open door retaining its increased leverage relation while open and the closed door retaining its decreased leverage resistance while closed.

14. In an automatic weighing device, a two compartment container, wing doors controlling the discharge openings of said compartments, a pivoted rocker element having connections to the hinged wing doors whereby as either door is opened the other door is closed, the connections of the doors to the rocker element being secured at points above the plane of the pivot of the latter to increase the operative power efficiency of the opening door, inherent therein and as acquired from the gravitative force of the commodity, and decrease the resistance of the closing door, and employing said increased operative power in the operation of said weighing device.

15. In an automatic weighing device, a double hopper, a pair of wing doors controlling the discharge openings of said hopper, a T-shaped rocker pivoted at its lower extremity on the hopper, a pair of links having their lower ends pivotally connected to said doors respectively and their upper ends pivotally connected to the respective ends of said rocker, and a latch mechanism to alternately hold said rocker in reverse positions and thereby alternately hold said doors in closed position.

16. In an automatic weighing device, a pair of hinged wing doors, a pair of links having their respective lower ends connected to said doors, a rocker element on the container and pivotally connected to the upper ends of said links connected thereto whereby as either door shall be opened the other door shall be closed, a locking element bearing a fixed relation to said rocker element and a vertically movable stop mounted on a relatively stationary object and adapted to alternately engage reverse sides of the locking element, said stop being restricted in its downward movement but permitted to yield upwardly to permit free passage of the locking element to reverse position after it is disengaged from the stop by downward movement.

17. In an automatic weighing device, a two-compartment container, wing doors controlling the discharge openings of said compartments, a T-shaped rocker pivotally mounted near its lower extremity on the container, a pair of links having their respective lower ends connected to said doors respectively and their upper ends connected to the respective arms of said T-shaped rocker whereby as either door is opened the other door is closed, the relation of the connections of said links to the rocker and its pivotal mounting being such that the opening door shall gain in leverage on said rocker as it opens while the closing door cooperatively decreases in resistance in order to increase the operative power efficiency of the opening door in its opening movement inherent therein and acquired from the gravitative force of the discharging commodity and to increase the holding force of the open door and decrease its resistance in the latter part of its closing movement and when closed.

18. In an automatic weighing device, a two-compartment container, wing doors controlling the discharge openings of said compartments, a T-shaped rocker pivotally mounted near its lower extremity on the container, a pair of links having their respective lower ends pivotally connected to said doors respectively whereby as either door shall be opened the other door shall be closed and the relation of said container, doors, links and rocker being such that the open door gains in leverage on said T-shaped rocker as it opens while the closing door cooperatively decreases in resistance.

19. In an automatic weigher, a yieldingly-elevated hopper having two compartments, a door for each compartment said doors being simultaneously operable in reversed directions, a T-shaped rocker bar pivotally mounted at its lower end on the container, links pivotally connected to the respective arms of the rocker bar and pivotally connected to said doors respectively, and means for locking the closed door in closed position.

JAMES B. VAN DEREN.